US007032867B2

(12) United States Patent
Johnson

(10) Patent No.: US 7,032,867 B2
(45) Date of Patent: Apr. 25, 2006

(54) CABLE CLAMP

(76) Inventor: Bruce D. Johnson, 9514 Nicollet Ave. South, Bloomington, MN (US) 55420

( * ) Notice: Subject to any disclaimer, the term of this patent is extended or adjusted under 35 U.S.C. 154(b) by 31 days.

(21) Appl. No.: 10/714,003

(22) Filed: Nov. 14, 2003

(65) Prior Publication Data

US 2004/0118981 A1 Jun. 24, 2004

Related U.S. Application Data

(63) Continuation-in-part of application No. 10/326,029, filed on Dec. 19, 2002, now abandoned.

(51) Int. Cl.
*F16L 3/12* (2006.01)

(52) U.S. Cl. .................................................... 248/74.1

(58) Field of Classification Search .................. 248/56, 248/73, 49, 71, 74.1

See application file for complete search history.

(56) References Cited

U.S. PATENT DOCUMENTS

| | | | | |
|---|---|---|---|---|
| 753,398 | A * | 3/1904 | Hunt | 248/67.5 |
| 1,139,748 | A * | 5/1915 | Beatty | 174/157 |
| 1,370,544 | A * | 3/1921 | Leeper | 24/135 R |
| 1,413,690 | A * | 4/1922 | Slocum | 188/65.4 |
| 3,246,076 | A * | 4/1966 | Stoneburner | 174/157 |
| 4,032,212 | A * | 6/1977 | Faust et al. | 439/412 |
| 4,143,446 | A * | 3/1979 | Down | 24/115 R |
| 4,407,477 | A * | 10/1983 | Backlund et al. | 248/499 |
| 4,431,152 | A | 2/1984 | Reed, Jr. | |
| 4,517,408 | A * | 5/1985 | Pegram | 174/153 G |
| 5,021,905 | A * | 6/1991 | Sleger | 360/97.02 |
| 5,184,794 | A | 2/1993 | Saito | |
| 5,535,969 | A | 7/1996 | Duffy, Jr. | |
| 5,794,897 | A | 8/1998 | Jobin et al. | |
| 6,227,502 | B1 | 5/2001 | Derman | |
| 6,458,104 | B1 | 10/2002 | Gautsche | |
| 2003/0136884 | A1* | 7/2003 | Miura | 248/68.1 |

* cited by examiner

*Primary Examiner*—A. Joseph Wujciak
(74) *Attorney, Agent, or Firm*—Clayton R. Johnson

(57) ABSTRACT

The cable clamp is mountable to a supporting structure and includes a base and a cover mountable to the base. The base is longitudinally elongated and has a channel extending longitudinally therethrough with longitudinally spaced, elongated, somewhat bubble shaped recesses opening upwardly through the channel web. Transversely spaced lands provide the side walls of the channel. The cover is longitudinally elongated and has a top wall with flanges dependingly joined to the perimetric edge of the cover. A longitudinally extending ridge is dependingly joined to the top wall whereby, in conjunction with the flanges, there are provided cavities of a size to have the base lands extended therein. The ridge has spaced protrusions alignable with the base recesses to force the cable thereinto when extended through the channel when the clamp screws are tightened to retain the cover in clamping relationship to the base.

6 Claims, 5 Drawing Sheets

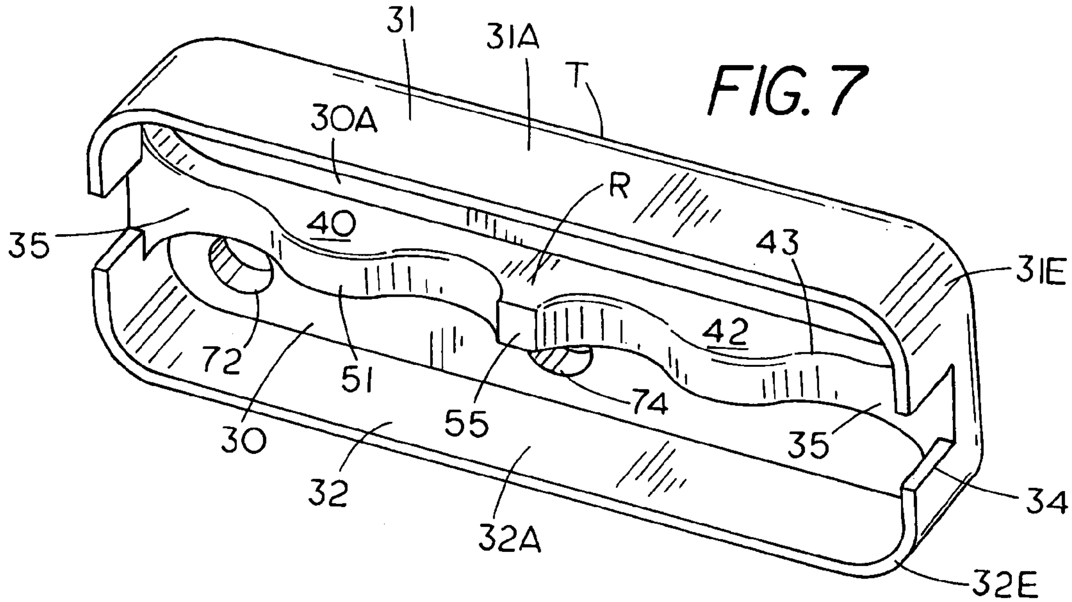
FIG. 7
FIG. 8
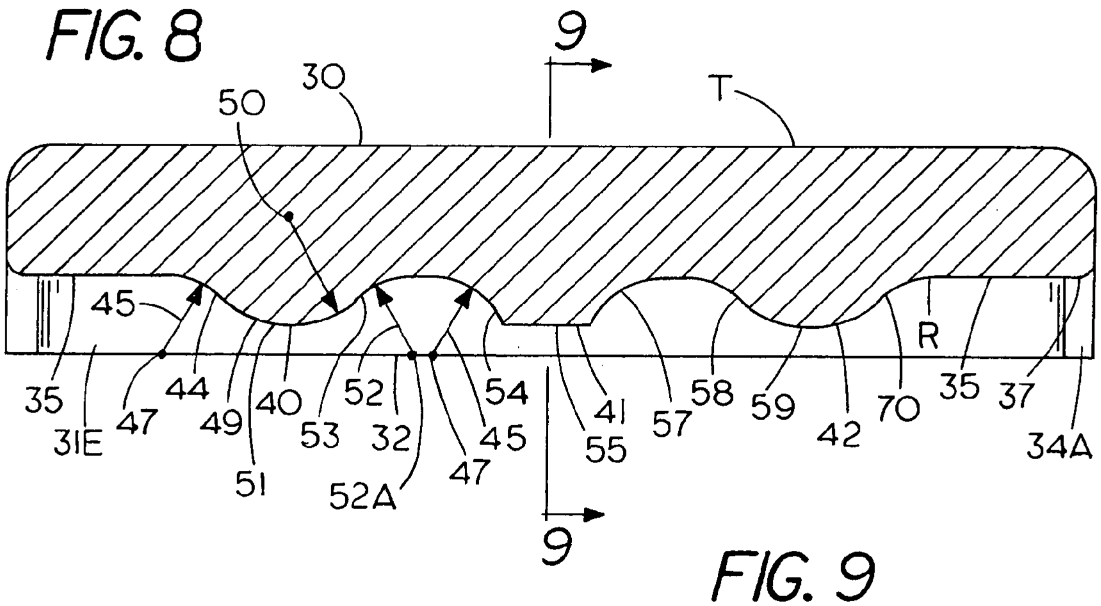
FIG. 9
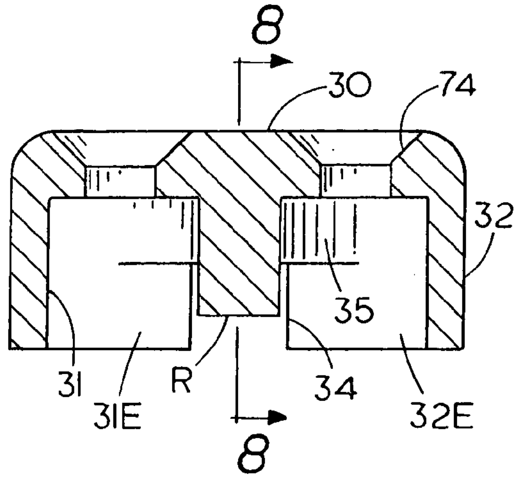

CABLE CLAMP

RELATED APPLICATIONS

This application is a continuation-in-part of Ser. No. 10/326,029, filed Dec. 19, 2002 now abandoned.

BACKGROUND OF THE INVENTION

This invention is for apparatus for securing one end portion of a cable in a fixed position while the cable is supporting other structure, for example bay and bow windows of a house.

At the present time there are cleat devices that are mountable to a house and have cables laced in abutting relationship to jam lugs and the ends of the cables remote from the loads being supported are bent at about right angles from the adjacent lugs and are secured to the house by U-shaped (fence) staples to prevent the cables slipping relative to the house while supporting loads.

U.S. Pat. No. 4,373,463 to Beaudette discloses a cleat device having adjacent oppositely opening jam cleats intermediate a pair of hooks for restraining a flexible line with one of its end portions laced in abutting relationship to the jam cleats and the hooks.

In order to provide devices that are relatively inexpensive and usable to retain one end portion of a cable or a rope in a fixed condition without requiring the use of supplemental devices to retain the end portion of the cable in a fixed position, this invention has been made.

SUMMARY OF THE INVENTION

The support apparatus includes a base and a cover for the base which is mountable to support structure, for example a side of a house. The base has a channel extending the longitudinally length thereof and has bowl (bubble) shaped recesses opening to the channel web while the cover has a longitudinal ridge (jaw) extendable within the base channel and having protrusions extendable into the base recesses to clamp a cable or rope therebetween. Screws are extendable through the longitudinal mid-portion of the cover and threaded into base apertures to retain the cover and base in a clamping relationship to a cable or rope while the cable clamp is mountable to a supporting surface by screws extended through other apertures in the clamp cover and base. In one embodiment, the base is provided with chisel point ridges to give greater stability to the clamp in use.

An object of this invention is to provide a new and novel cable clamp for clampingly engaging a cable or rope to retain one end portion of a cable or rope in a fixed position without the need to provide an additional device to retain the cable or rope in a fixed position.

For the purposes of facilitating the description of the invention, the cable clamp will be considered to have the bottom of the base abutting against the top surface of a supporting surface even though in usage, usually the base bottom surface is in abutting relationship to a supporting surface.

BRIEF DESCRIPTION OF THE DRAWINGS

FIG. 7 is a perspective view of the clamp cover of the first embodiment of this invention.

FIG. 8 is a transversely centered, longitudinal cross sectional view of the first embodiment of the clamp cover that is generally taken along the line and in the direction of the arrows of FIG. 9;

FIG. 9 is a transverse cross sectional view generally taken along the line and in the direction of the arrows 9—9 of FIG. 8;

DESCRIPTION OF THE PREFERRED EMBODIMENTS

Figure 1:
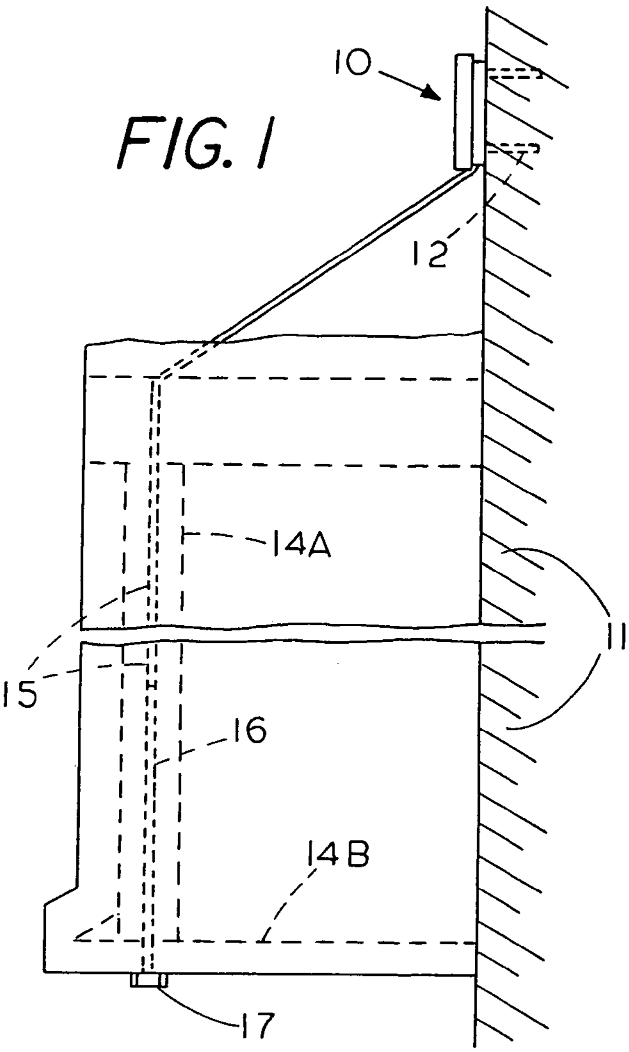
FIG. 1 is a somewhat diagrammatic showing of the use of the clamp of this invention for supporting a bay window, only parts of the bay window being shown.
Figure 2:
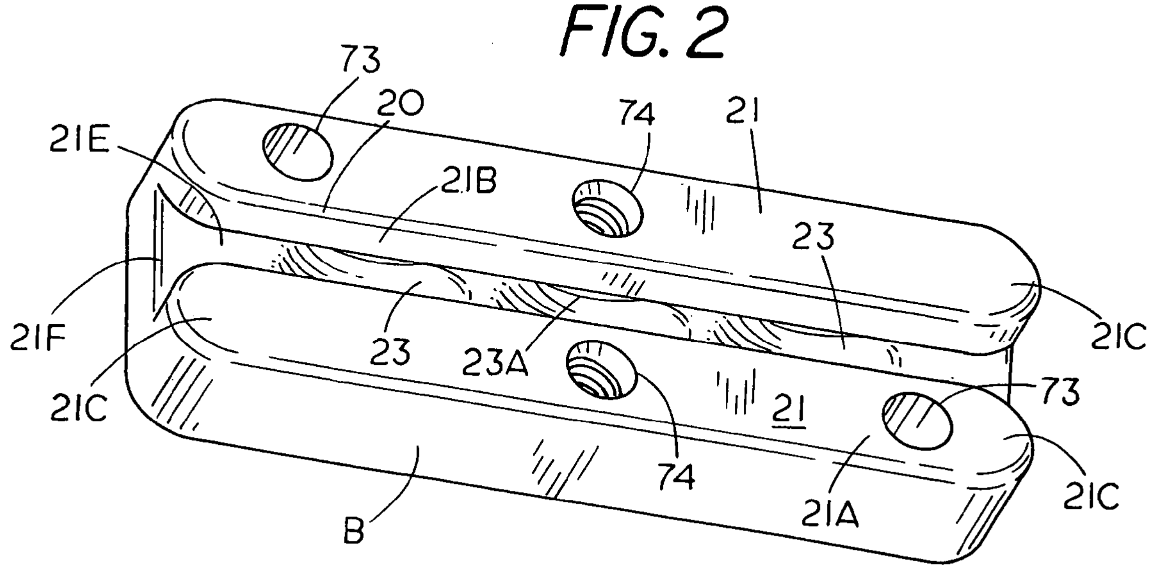
FIG. 2 is a perspective view of the first embodiment of the clamp base of this invention.
Figure 3:
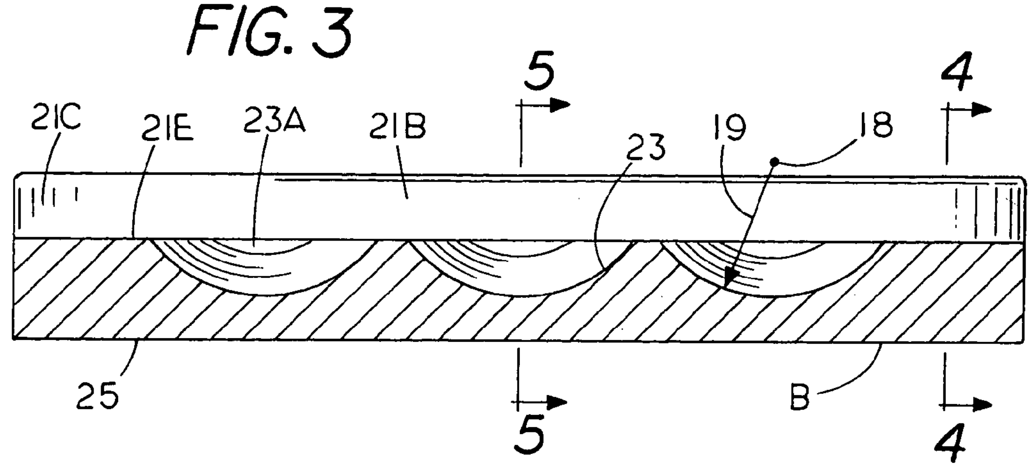
FIG. 3 is a transversely centered, longitudinal cross sectional view of the clamp base of the first embodiment that is generally taken along the line and in the direction of the arrows of FIG. 5.
Figure 4:
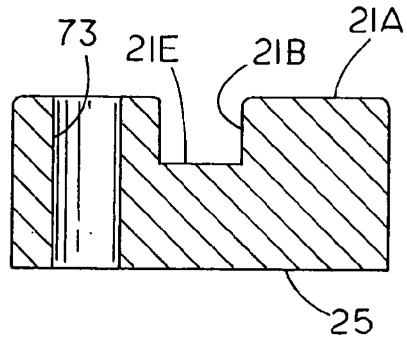
FIG. 4 is a transverse cross sectional view of the first embodiment that is generally taken along the line and in the direction of the arrows 4—4 of FIG. 3.
Figure 5:
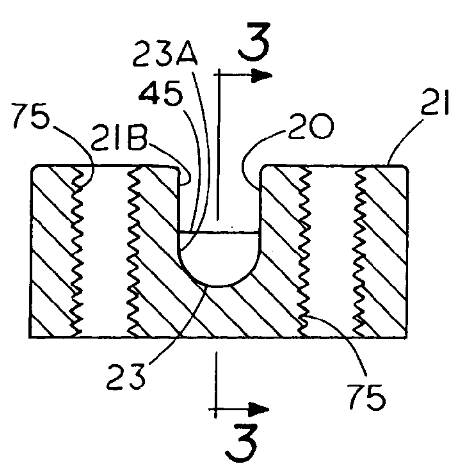
FIG. 5 is a transverse cross sectional view generally taken along the line and in the direction of the arrows 5—5 of FIG. 3.
Figure 6:
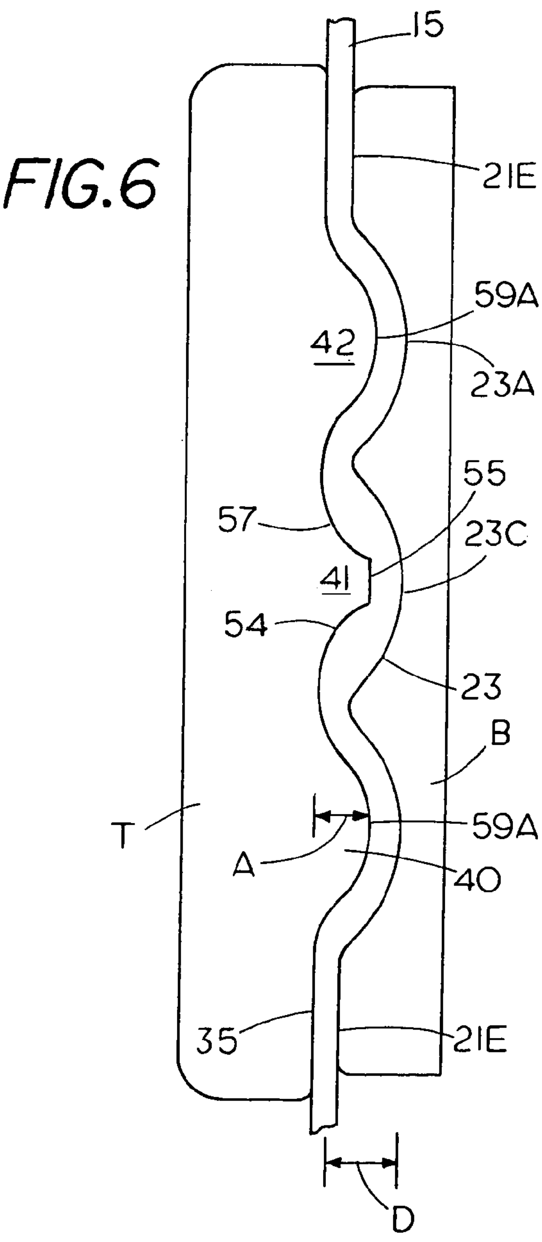
FIG. 6 is a generally diametrically longitudinal, transversely centered, cross sectional view showing in outline the clamp base and clamp cover clampingly engaging the end portion of a cable or rope.
Figure 10:
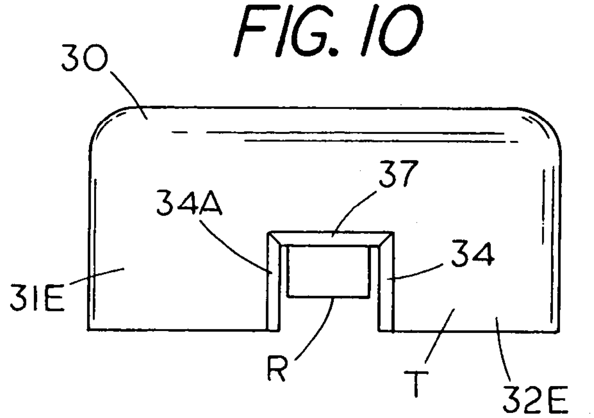
FIG. 10 is an end view of the first embodiment of the clamp cover.
Figure 11:
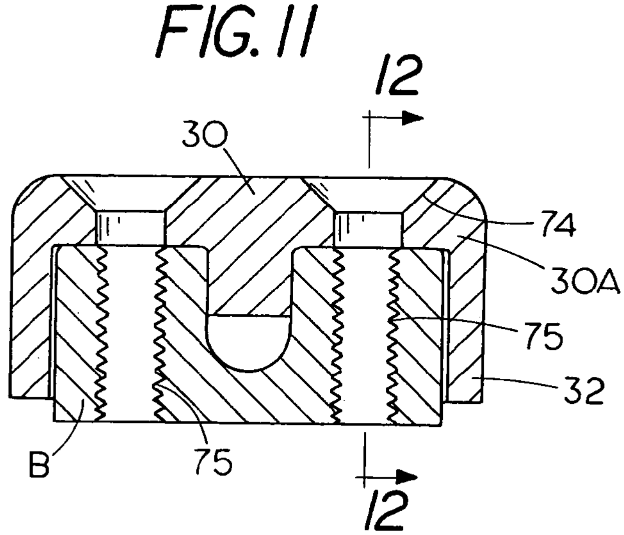
FIG. 11 is a transverse cross sectional view of the first embodiment of the cable clamp with no cable being extended between the clamp base and cover.
Figure 12:
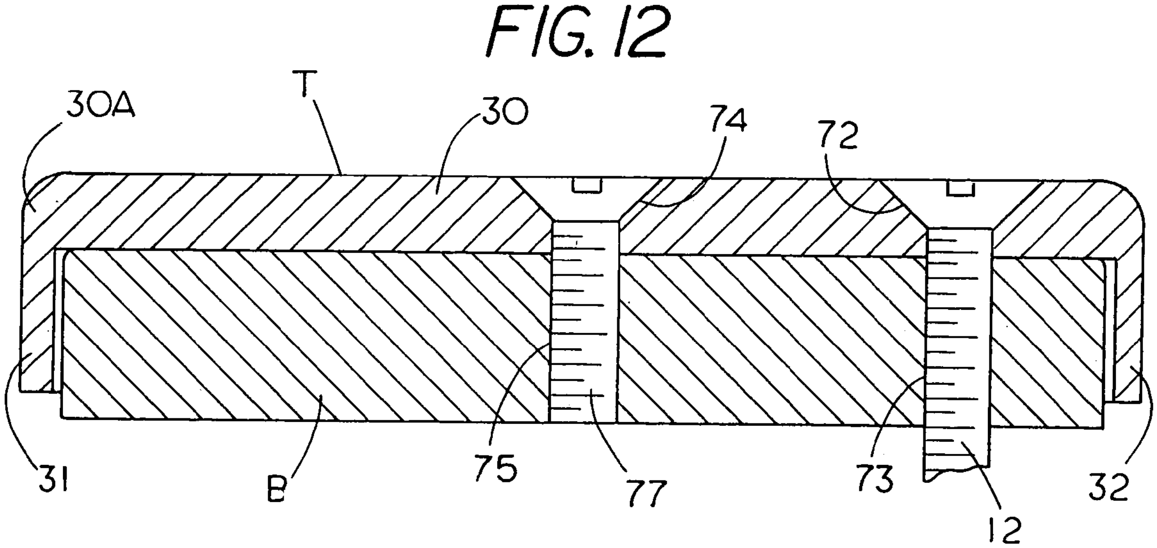
FIG. 12 is a longitudinal cross sectional view that is generally taken along the line and in the direction of the arrows 12—12 of FIG. 11.

Referring to the drawings, and in particular to FIG. 1, there is diagrammatically shown the first embodiment of a cable clamp, generally designated 10, mounted by nails or screws 12 to an exterior wall 11 or to an overhanging part (not shown) of a house above a bow or a bay window 14 which is generally shown in outline other than for the dotted line showing of a mullion 14A and a seat board 14B of the window. The mullions 14A are remote from the house exterior wall. Conventional cable assemblies may be used in conjunction with the clamps of this invention to prevent or minimize sagging of bay or bow windows. Such cable assemblies may include cables 15, rods 16, fasteners 17 and may include turnbuckles.

One end portion of a cable 15 is clamped between the clamp base B and clamp cover T while an intermediate portion is extended downwardly through a mullion and has its lower end joined to a rod 16 which extends downwardly through the seat board. The use of a cable extending into and/or at least partially through a mullion is conventional. A suitable fastener 17, for example a washer and nut, are mounted to the lower end of the rod in supporting relationship to the seat board to minimize possible sagging of the window.

Referring in particular to FIGS. 2–6, the cable base B comprises a longitudinally elongated block with a channel 20 extending the length thereof to provide longitudinally elongated, transversely spaced lands 21, 21. As may be seen from FIG. 2, the longitudinal length of the block is substantially greater than the transverse width thereof. Longitudinal opposite ends 21C of the lands are rounded as seen in plan view. The top surfaces 21A of the lands are coplanar, other than for the top perimetric land edges which may be chamfered. Further, the adjacent vertical surface portions 21B of the lands, other than for the rounded ends and the perimetric chamfered edges, if provided, are parallel to one another and form the side walls 21B of the channel 20. The base has a surface 21E that forms a channel web extending between the web side walls 21B and, other than for recesses 23 and with the possible exception of its longitudinal opposite ends 21F of end portions 21E, is parallel to the land top surfaces. The longitudinal opposite web ends may be chamfered 21F to converge toward the base planar bottom surface 25 in opposite longitudinal directions.

Advantageously, there are provided at least three longitudinally spaced, longitudinally elongated, bubble shaped recesses 23 which are of the same shape and size. The recesses are arcuately concave in longitudinal cross section and equally spaced from the adjacent recess. Further, in transverse cross section, the recesses are arcuately concave, other than for transverse opposite portions 23A that may be parallel continuations of the channel side walls. Advantageously, the transverse center part of each recess in a longitudinal direction has a radius of curvature 19 that emanates from a point 18 which is vertically spaced above the top surface of the base in longitudinally centered relationship to the recess. Preferably, the maximum longitudinal length of each recess at its opening to the web surface is greater than the minimum transverse spacing of the channel side walls and is greater than its radius of curvature 19. Thus, the radius of curvature 19 of the major portion of the transverse center part of each recess is much greater than that of the longitudinal center part of the transverse curvature of each recess whereby the maximum longitudinal length of each recess is many times greater than the maximum transverse width of the respective recess. Accordingly, the recesses are of the same depth, (trough 23A of each recess being of the same depth) D. Thus the vertical spacing of the troughs from the plane of the longitudinally planar part of the surfaces 21E is of the depth D. Also, the longitudinally remote recesses are longitudinally spaced from the longitudinal opposite ends of the base.

Referring to FIGS. 7–10, the cover T includes a top wall 30 that is longitudinally elongated and, other than for its rounded corner portions, is rectangular. Joined to the top wall to extend downwardly therefrom is a transversely centered ridge R that advantageously extends substantially the longitudinal length of the cover to be joined to the cover end flange portions 31E, 32E. Also joined to the peripheral top wall edge portions 30A to depend therefrom are transversely opposite flanges 31, 32. The flanges have longitudinally elongated, parallel portions 31A, 32A with there being end portions (inturned portions) 31E, 32E joined to each end of the respective parallel portion and then curved to thereafter extend transversely toward one another to be integrally joined and to extend vertically downwardly a greater distance from the top wall than the maximum perpendicular spacing of the ridge from the top wall. The transverse spacing of the longitudinal portions of each of the flanges from the transversely adjacent part of the ridge is the same whereby the top wall has bottom surface portions 30A on transverse opposite sides of the ridge that are of substantially the same shapes of the lands in plan view and of sizes to have the lands abuttable thereagainst. The bottom surface portions 30A of the top wall are coplanar and are rounded at the longitudinally opposite end portions. The longitudinally opposite end portions 35 of the ridge are progressively transversely wider in longitudinal directions away from one another to intersect with the inturned portions 31A, 31B of the flanges at each longitudinal end of the ridge. Further, advantageously the bottom surfaces of end portions 35 are coplanar and planar to the top wall surface 30, other than being rounded at 37 to extend upwardly in longitudinally opposite directions.

At each longitudinal end of the cover, the flange end portions 31A, 32A are joined to one another with there being a slot 34 formed therein that opens downwardly and is in part formed by the rounded edges 37 and in part by vertical edges 34A. The edges 34A in cross section parallel to the cover top wall may be rounded or converge inwardly toward the longitudinally opposite end of the cover. The edges 34A are transversely centered and advantageously may be of a slightly greater transverse spacing than the maximum transverse spacing of the ridge longitudinally intermediate the ridge end portions 35 and diverge in a downward direction.

The ridge R longitudinally intermediate its end portions 35 is of a generally undulating shape in longitudinal cross section and other than the possible exception of having transversely opposite chamfered edge portions 43, is of the same transverse dimension between the end portions 35 and of a slightly smaller transverse dimension than that between the transversely adjacent parts of the land side walls. The combined transverse dimension of the ridge chamfered edge portions, if provided, is many times smaller than the transverse dimension longitudinally intermediate the ridge edge portions 35 and is greater than the radius of the maximum diameter of a cable that is to be clamped. Assuming the base has three recesses 23, then the ridge R is provided with three generally convex protrusions 40, 41, 42 with the longitudinally remote protrusions 40, 42 advantageously being of the same shape and size. As an example of the shape of the ridge protrusions, as in viewing FIG. 8 from left to right, the surface-portion 44 of the protrusion 40 intersects with the left end portion 35 to be concavely curved about a radius 45 that emanates from a point 47 that is vertically adjacent to the plane of the bottom edges of the flanges and intersects with the convexly curved surface portion 51 that has a radius of curvature 49 emanating from a point 50 that is at an elevation that is adjacent to the plane of the bottom surfaces of the cover flanges and thereafter, has its surface concavely curved at 53 about a radius 52 that emanates from a point that is at the same elevation from which the radius 45 emanates.

The ridge protrusion 41 includes a concavely curved portion 54 having a radius of curvature 45 that intersects with a curved surface portion 53 and with the horizontal (flat) surface 55 while the longitudinally opposite transverse edge of surface 55 intersects with the concavely curved surface 57 that is curved about a radius 52 which is to the right of the first mentioned radius 52. The surface 57 in turn intersects with the concavely curved surface 58 of the protrusion 42 which has a radius of curvature 45, protrusion 42 also having a convexly curved surface 59 intersecting surface 57 and the concavely curved surface 70. Surfaces 59 and 70 are curved about radii 49 and 45 respectively. Surface 70 intersects with the planar surface of ridge right end portion 35.

The surface 55, which constitutes the crest of protrusion 41, is substantially coplanar with the crests 59A of the protrusions 40, 42. The amplitude A of each of the crests advantageously is the same. With the ridge extended into the channel and the protrusions and recesses longitudinally aligned, the planar surface 55 is abuttable against the longitudinally intermediate part of the longitudinal center recess while the crests of the other two protrusions are slightly vertically spaced from the troughs of the other two recesses, and the lands 21 abut against the planar surfaces of cavities 30A. At this time, the base and cover may be of a construction that the planar surface of the base end portions 21E may abut against or be vertically spaced from the planar surfaces 35 of the ridge by a dimension less than the diameter of the cable that is to be clamped.

The diagonally opposite corners of the cover have apertures 72 extended vertically therethrough and are alignable with apertures 73 in diagonally opposite corner portions 21C of the base B to have mounting screws (fasteners) 12 extended therethrough to have the screw head portions abutting against the cover. The lower non-chamfered portions of the apertures 72 may or may not be threaded, but in either event, the diameters of the lower part of the apertures 72 are sufficiently great that the cover may be moved perpendicularly relative to the base with the fasteners 12 initially being threaded into the supporting structure and, up until the fasteners 12 are threaded into the supporting structure to have the heads of the fasteners abut against the chamfered part of the apertures 72 to retain the cover in clamping relationship to the base and in fixed relationship to the supporting structure or until the clamping screws 77 are threaded into the base to prevent the cover being movable relative to the base. The apertures 73 may or may not be threaded, and if threaded, may or may not have the threads form a mating fit with the fasteners 12. Thus, the base may or may not be movable relative to the supporting structure during the initial threading of the fasteners 12 into the supporting structure.

Further, the cover has longitudinally centered apertures 74 extended therethrough on transversely opposite sides of the ridge and alignable with threaded apertures 75 extended through the base on transversely opposite sides of the base channel. The apertures 74 are of sufficiently large diameters relative to the screws 77 to permit the cover being perpendicularly movable relative to the base until the screws are sufficiently threaded into base to have the heads of the screws firmly abut the cover to retain it in a fixed condition relative to the base.

In use, the cover is placed over the base B and the mounting screws 12 are extended through the apertures 72, 73 at each end of the clamp and loosely threaded into the mounting structure whereby the clamp is held in the desired location while the cover is sufficiently spaced relative to the base that the end portion of the cable is extendable through the base channel to be located between the ridge and the channel web. At this time, the cover flanges extend downwardly to surround the upper part of the base, other than for the slotted portion 34, to aid in guiding the cover to be properly aligned with the base for clampingly engaging the cable or rope. With the cable being adjusted to the position in which it is desired to be retained, the clamp screws (fasteners) 77 are extended through the apertures 74 and threaded into the apertures 75 so that the protrusions force the cable to extend into the recesses to firmly hold the cable in a fixed position relative to the clamp. With reference thereto, the crests of the protrusions 40, 42 are aligned with the bottom of the troughs of the adjacent recesses. The planar surface 55 is opposite the bottom of the longitudinal center portion 23A of the middle recess. The intersection of the planar surface 55 with curved portions 54, 57 provide relatively sharp transverse edges that bite against the cable and more firmly press the adjacent cable portion against the trough portion 23C to prevent slippage upon tightening down the mounting screws and thereby retaining the cable firmly clamped between the cover and the base. Thence the mounting screws 12 are tightened down to have their heads abut against the cover top surface (chamfered portions of apertures 72). Thereafter, the mounting screws 12 are tightened to have their heads abut against the cover to firmly retain the cover and base in a fixed relationship to the supporting surface 11, that is, firmly press the base against the supporting structure to firmly hold the clamp in a fixed position relative to the supporting structure.

Referring to FIGS. 13–16, the second embodiment of the cable clamp of this invention, generally designated 100, includes a base (block) X that is of the same construction as the base B of the first embodiment with the exception the base X has elongated chisel point ridges 102, 103 integrally joined to the substantially planar bottom surface 104 of the clamp base to extend away therefrom in a direction away from the top surfaces 121A of the base lands 121. The chisel point ridges are diagonally opposite one another with the ridge 103 having a longitudinally elongated portion 103B extending along one longitudinal side surface 105 of the base and ridge 102 has a longitudinally elongated portion 102B extending along the transversely opposite longitudinal side surface of the base. Further, the chisel point ridge 102 has a transversely elongated portion 102A extending one transverse end surface 107 of the base while the ridge 103 has a transversely elongated portion 103A extending along the opposite transverse end surface of the base. Accordingly, each chisel point ridge has a longitudinally extending portion and a transversely extending portion. Thus, each of the chisel point ridges has portions that extend horizontally at an angle other than 180 degrees relative to another portion of the same chisel point ridge.

Figure 13:
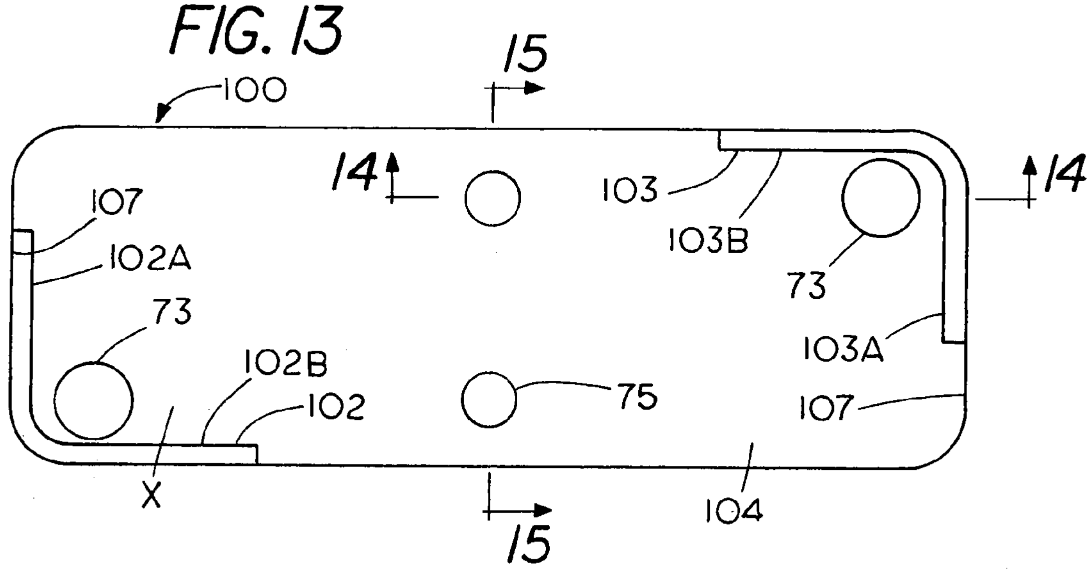
FIG. 13 is a bottom view of the clamp base of the second embodiment of this invention.
Figure 14:
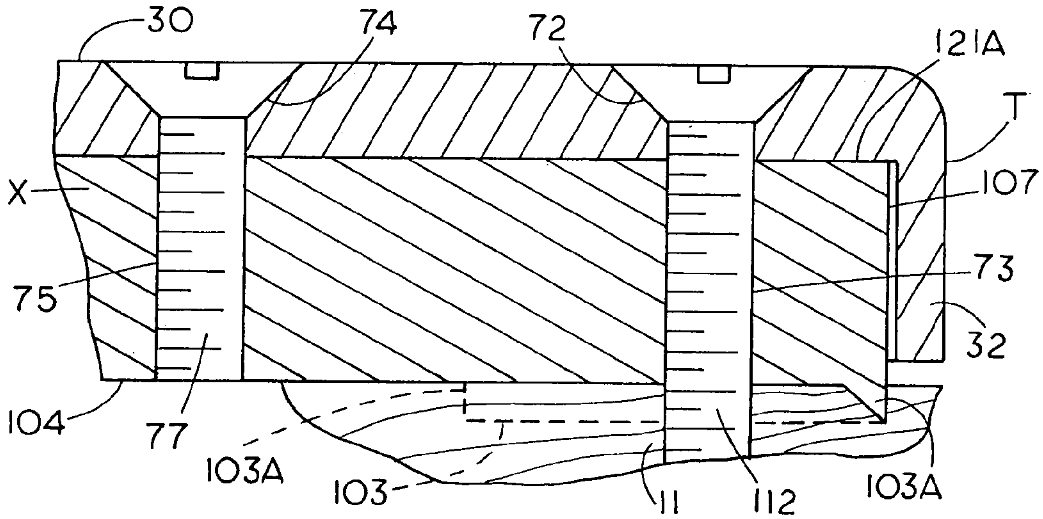
FIG. 14 is an enlarged, fragmentary, longitudinal cross sectional view of the cable clamp of the second embodiment that is generally taken along the line and in the direction of the arrows 14—14 of FIG. 13.
Figure 15:
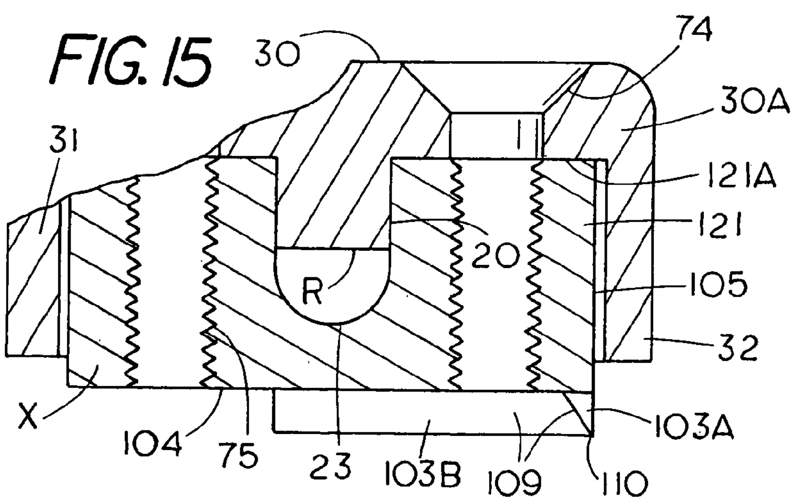
FIG. 15 is an enlarged, fragmentary, transverse cross sectional view of the cable clamp of the second embodiment that is generally taken along the line and in the direction of the arrows 15—15 of FIG. 13.

In the event the base in plan view has rounded corners, then the longitudinal and transverse portion of each of the ridges may be joined by a rounded chisel point ridge part as seen in plan view such as shown in FIG. 13 with the rounded part being horizontally located between the adjacent mounting screw apertures 73 and the adjacent part of the vertical peripheral surface of the base and the longitudinal portion of each chisel point ridge extending at about right angles to its transverse portion. It is to be understood that the chisel point ridges may be joined to the base to depend therefrom spaced from the bottom peripheral edge of the base. Advantageously, with the base having its planar bottom surface in a horizontal plane, each of the transverse and longitudinal chisel edge portions of each of the chisel point ridges is elongated in a horizontal direction to be of a dimension at least 25 percent of the maximum transverse dimension of the base.

Figure 16:
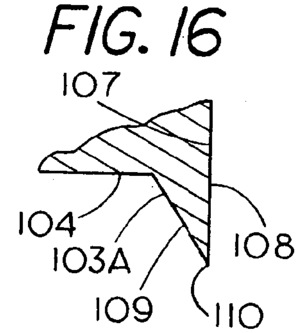
FIG. 16 is a further enlarged cross sectional view of the chisel point ridge dependingly joined to the clamp base of the second embodiment.

Advantageously, each chisel point ridge has a vertical surface 108 that is substantially a vertically straight line continuation of the adjacent portion of the vertical peripheral surface extending below the base planar surface and has a beveled surface 109 extending downwardly from the planar base to intersect at an acute angle with surface 109 to provide a sharpened edge 110 such as shown in FIG. 16 of edge portion for chisel point ridge portion 103A. The surfaces 108, 109 are horizontally elongated when the planar bottom surface is horizontal and extend along the length of ridges 102, 103 respectively and converge toward one another in a direction downwardly of the base planar surface to intersect at the sharpened edge 110 that extends at least nearly the length of each of the respective chisel point ridges.

The cover of the second embodiment is the same as the cover T of the first embodiment. The use of the second embodiment is the same as the first embodiment other than what occurs when the chisel point ridges engage the supporting surface. That is, the cover is placed over the base and the mounting screws 112 are extended through the apertures 72, 73 at each end of the clamp and loosely threaded into the mounting structure 11 whereby the clamp is held in the desired location while the cover is sufficiently spaced relative to the base X that the end portion of the cable is extendable through the base channel to be located between the ridge R and the channel web. With the cable being adjusted to the position in which it is desired to be retained, the clamp screws (fasteners) 77 are extended through the apertures 74 and threaded into the apertures 75 so that the protrusions force the cable to extend into the recesses to firmly hold the cable in a fixed position relative to the clamp. Thence, the mounting screws 12 are threaded to have their heads abut against the cover top surface (chamfered portions of apertures 72). This will force the chisel point ridges to penetrate into the supporting surface 11, assuming it is made of wood or similar material. Thereafter, the mounting screws 12 are tightened to have the planar bottom surface 104 abut against the supporting structure 11. Over a period of time, the weight supported by the clamps of the first embodiment can result in some bending of the supporting screws with a clamp moving a limited amount; however, with the base X, the chisel point ridges in penetrating into the supporting structure 11, the clamp of the second embodiment is more firmly retained in place and thus prevent slight shifting of the clamp relative to the supporting structure.

If the clamp of either embodiment is made of a metal such as brass or zinc, during the tightening of the screws 77, 112, the surfaces of the clamp which abut against the cable may be deformed forming slight indentations with the cable abutting there against to more firmly hold the cable than if such deformation did not take place.

What is claimed is:

1. A cable clamp in a generally horizontal condition and mountable to a supporting structure for clampingly engaging a cable or rope that supports a load, a base that includes a block of a longitudinal length greater than its transverse width, the block having an upwardly open channel extending the longitudinal length thereof for having the cable or rope extended therein the length of the block, the channel having a web surface and transversely spaced side walls, longitudinally spaced recesses opening upwardly through the web surface and transversely spaced lands that at least in part define the channel side walls, a longitudinally elongated cover having a top wall with perimetric edge portions, flanges dependingly joined to the top wall edge portions and having transversely opposite longitudinally elongated portions, a longitudinally elongated ridge dependingly joined to the top wall in transversely spaced, transversely centered relationship to the flange longitudinal portions, the maximum distance that the ridge depends from the cover top wall being less than the maximum distance the flanges depend from the top wall, the cover ridge being extendable into the base channel and having protrusions in about the same longitudinal spaced relationship as the recesses, the ridge, flanges and top wall defining a cavity on each transverse side of the ridge of a size and shape to have the base lands extendable thereinto to abut against the top wall, the base and cover having vertically aligned mounting screw apertures, and fasteners for securing the cover to the base for clamping the cable between the ridge and the base recesses.

2. A cable clamp in a generally horizontal condition and mountable to a supporting structure for clampingly engaging a cable or rope that supports a load, a base that includes a block of a longitudinal length greater than its transverse width, the block having an upwardly open channel extending the longitudinal length thereof for having the cable or rope extended therein the length of the block, the channel having a web surface and transversely spaced side walls, longitudinally spaced recesses opening upwardly through the web surface, each of the base recesses being of about the same depth and concavely curved to open in an upward direction, and transversely spaced lands that at least in part define the channel side walls, a longitudinally elongated cover having a top wall with perimetric edge portions, flanges dependingly joined to the top wall edge portions and having transversely opposite longitudinally elongated portions, a longitudinally elongated ridge dependingly joined to the top wall in transversely spaced, transversely centered relationship to the flange longitudinal portions, the cover ridge being extendable into the base channel and having protrusions in about the same longitudinal spaced relationship as the recesses the protrusions including longitudinally remote first and second protrusions and a longitudinally intermediate third protrusion, the first and second protrusions being convexly curved to extend in a downward direction each having a crest with the third protrusion also extending in a downward direction and having a crest, and fasteners for securing the cover to the base for clamping the cable between the ridge and the base recesses.

3. The cable clamp of claim 2 wherein the third protrusion has longitudinally opposite, concavely curved surface portions and a planar crest surface intersecting the third protrusion concavely curved surface portion.

4. The cable clamp of claim 3 wherein the amplitude of each of the crests is substantially the same, each of the recesses has a trough that is substantially the same depth as the other recesses and the maximum longitudinal dimension of each of the protrusions is substantially the same.

5. The cable clamp of claim 2 wherein the flange longitudinal portions have longitudinally opposite ends and the flanges have transverse inturned portions joined to the end portions of flange longitudinal portions, the flange inturned portions having transversely adjacent ends joined to one another and having downwardly opening slots with top transverse edges at about the elevation as the adjacent ridge end portion.

6. A cable clamp in a generally horizontal condition and mountable to a supporting structure for clampingly engaging a cable or rope that supports a load, comprising a longitudinally elongated base having an upwardly opening channel, the channel having a web surface, longitudinally spaced, upwardly opening, concavely curved first, second and third recesses opening to the web surface with the second recess being longitudinally intermediate the first and third recesses, a longitudinally elongated cover having a top wall and a longitudinally elongated ridge having first, second and third protrusions at least partially extendable into the first, second and third recesses respectively, the cover and base having vertically aligned clamp screw apertures with at least one of the cover apertures and the base apertures being threaded, and clamp screws extendable into the mounting screw apertures and threaded in the threaded apertures to removably secure the cover and base in a clamping relationship, the first and third protrusions being convexly curved and having crests and the second protrusion having a crest that is generally planar to provide transversely extending edges, the amplitude of the crests being substantially equal and the second recess having a concavely curved surface that is abuttable against the second protrusion edges in longitudinal spaced relationship with the second crest intermediate its transverse edges being spaced from the second recess surface.

* * * * *